United States Patent [19]

St. Pierre et al.

[11] Patent Number: 5,216,681
[45] Date of Patent: Jun. 1, 1993

[54] HIGHLY-EFFICIENT SOLID-STATE BLUE LASER

[75] Inventors: Randall J. St. Pierre, Santa Monica; Hagop Injeyan, Glendale, both of Calif.; Larry G. DeShazer, Redmond, Wash.

[73] Assignee: TRW Inc., Redondo Beach, Calif.

[21] Appl. No.: 739,974

[22] Filed: Aug. 5, 1991

[51] Int. Cl.⁵ .............................................. H01S 3/10
[52] U.S. Cl. ...................................... 372/22; 372/18; 372/41; 372/75
[58] Field of Search ................ 372/41, 75, 18, 22, 372/69, 70, 20, 71, 23

[56] References Cited

U.S. PATENT DOCUMENTS

| | | | |
|---|---|---|---|
| 4,284,962 | 8/1981 | Esterowitz et al. | 331/94.5 F |
| 4,347,485 | 8/1982 | Esterowitz et al. | 372/42 |
| 4,679,198 | 7/1987 | Shone et al. | 372/41 |
| 4,740,975 | 4/1988 | Abrahams et al. | 372/41 |
| 4,802,180 | 1/1989 | Brandle, Jr. et al. | 372/41 |
| 4,809,291 | 2/1989 | Byer et al. | 372/75 |
| 4,824,598 | 4/1989 | Stokowski | 372/41 |
| 4,829,597 | 5/1989 | Gelbwachs | 455/617 |
| 4,837,769 | 6/1989 | Chandra et al. | 372/41 |

OTHER PUBLICATIONS

Pixton; "Tripling YAG Frequency"; Laser Focus; Jul. 1978.
Jones et al; "Milliwatt-Level 213 nm Single Based on Repetitively Q-Switched CW-Pumped Nd: YAG Laser"; IEEE JQE, vol. QE-15(4); Apr. 1979.
Weinberg; "Tunable Optical Parametric Amplifiers & Generators Laser Focus" Apr. 1969.
Bowman, S. R. et al., "An Efficient Solid State Source of 455 and 459 Nanometers," Paper PD8, CLEO Technical Digest, Anaheim, CA, Apr. 25-29, 1988, pp. 470-472.

Primary Examiner—Leon Scott, Jr.
Attorney, Agent, or Firm—James M. Steinberger; Sol L. Goldstein

[57] ABSTRACT

A highly-efficient solid-state blue laser that exploits a strong emission line provided by a solid-state laser medium of neodymium-doped scandium oxide ($Nd:Sc_2O_3$) to produce a beam of coherent blue light at a wavelength matching the absorption line of cesium at 455.6 nm (0.4556 microns). The solid-state blue laser includes the laser medium of neodymium-doped scandium oxide, a semiconductor diode laser array for optically pumping the laser medium to produce a beam of coherent infrared radiation at a wavelength of approximately 1367 nm (1.367 microns), and optical means for tripling the frequency of the beam of coherent infrared radiation to produce a beam of coherent blue light at the wavelength of approximately 455.6 nm. The solid-state blue laser is simple, highly efficient and provides relatively high power outputs.

12 Claims, 2 Drawing Sheets

HIGHLY-EFFICIENT SOLID-STATE BLUE LASER

BACKGROUND OF THE INVENTION

This invention relates generally to solid-state lasers and, more particularly, to solid-state blue-green lasers, which operate at wavelengths between approximately 450 nanometers (0.45 microns) and 580 nm (0.58 microns).

Blue-green lasers have been proposed for use as a communications link between orbiting satellites and underwater submarines. The blue-green region of the electromagnetic spectrum is of interest because attenuation of light through sea water is minimized at the blue-green wavelengths. A submarine communications link would include an array of blue-green lasers positioned on each of a number of orbiting satellites to provide complete coverage of the earth's oceans and a very sensitive detection device placed onboard each submarine to receive the very faint laser signals.

The submarine detection device would require a solar filter, such as an atomic resonance filter, to remove background solar radiation which otherwise would prevent detection of the laser signals. An atomic resonance filter provides filtering by absorbing light at one wavelength and then reradiating the energy at another wavelength. The reradiated energy is then detected by some type of photodetector, such as a photomultiplier tube. One particular type of atomic resonance filter uses elemental cesium in vapor form and has absorption lines in the blue region of the electromagnetic spectrum at wavelengths of 455.6 nm (0.4556 microns) and 459.3 nm (0.4593 microns).

Although an atomic resonance filter provides extremely sharp filtering capabilities, the large distances involved between an orbiting satellite and an underwater submarine require that highly efficient lasers with relatively high power outputs be used. Solid-state lasers are preferred for satellite applications because of their small size and light weight. Although solid-state lasers have been designed that operate at wavelengths matching the absorption lines of cesium, these lasers are typically complex, not highly efficient and have relatively low power outputs. Accordingly, there exists a need for a simple, highly-efficient solid-state laser with relatively high power outputs that operates at a wavelength matching one of the absorption lines of cesium. The present invention clearly fulfills this need.

SUMMARY OF THE INVENTION

The present invention resides in a highly-efficient solid-state blue laser that exploits a strong emission line provided by a solid-state laser medium of neodymium-doped scandium oxide ($Nd:Sc_2O_3$) to produce a beam of coherent blue light at a wavelength matching the absorption line of cesium at 455.6 nm (0.4556 microns). The solid-state blue laser includes the laser medium of neodymium-doped scandium oxide, a semiconductor diode laser array for optically pumping the laser medium to produce a beam of coherent infrared radiation at a wavelength of approximately 1367 nm (1.367 microns), and optical means for tripling the frequency of the beam of coherent infrared radiation to produce a beam of coherent blue light at the wavelength of approximately 455.6 nm. The solid-state blue laser is simple, highly efficient and provides relatively high power outputs.

It will be appreciated from the foregoing that the present invention represents a significant advance in the field of solid-state lasers. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

Figure 1:
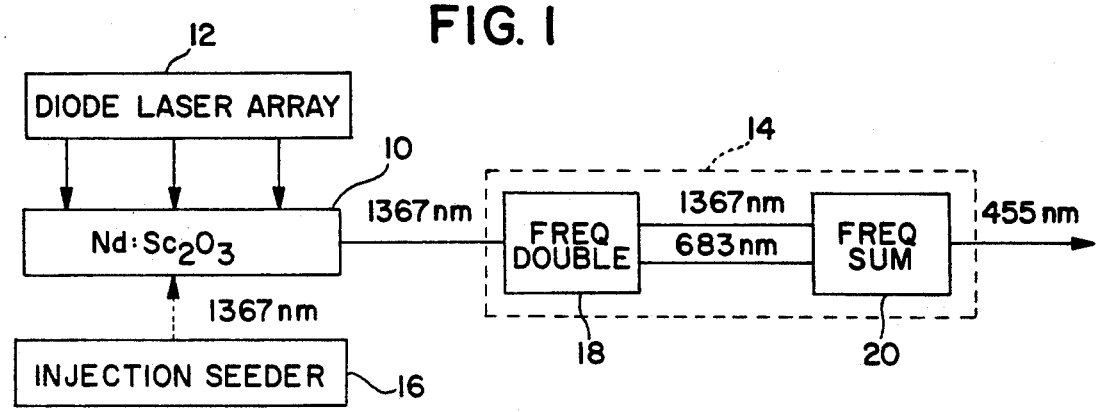
FIG. 1 is a block diagram of a solid-state blue laser in accordance with the present invention.

As shown in the drawings for purposes of illustration, the present invention is embodied in a highly-efficient solid-state blue laser that exploits a strong emission line provided by a solid-state laser medium of neodymium-doped scandium oxide ($Nd:Sc_2O_3$) to produce a beam of coherent blue light at a wavelength matching the absorption line of cesium at 455.6 nm (0.4556 microns). Blue-green lasers have been proposed for use as a communications link between orbiting satellites and underwater submarines. The blue-green region of the electromagnetic spectrum is of interest because attenuation of light through sea water is minimized at the blue-green wavelengths. One type of submarine detection device for detecting the laser signals uses a cesium atomic resonance filter, which has absorption lines at wavelengths of 455.6 nm (0.4556 microns) and 459.3 nm (0.4593 microns). Although solid-state lasers have been designed that operate at these wavelengths, these lasers are typically complex, not highly efficient and have relatively low power outputs.

In accordance with the present invention, a solid-state laser medium of neodymium-doped scandium oxide ($Nd:Sc_2O_3$) is optically pumped to provide a strong emission line at a wavelength of 1367 nanometers (1.367 microns). The frequency of this emission line is then tripled to produce a beam of coherent blue light at a wavelength of approximately 455.6 nm (0.4556 microns), thus matching one of the absorption lines of cesium. The solid-state blue laser is simple, highly efficient and provides relatively high power outputs.

FIG. 1 illustrates a highly-efficient solid-state blue laser in accordance with the present invention. The solid-state blue laser includes a solid-state laser medium 10 of neodymium-doped scandium oxide ($Nd:Sc_2O_3$), a semiconductor diode laser array 12 for optically pumping the laser medium 10 to produce a beam of coherent infrared radiation at a wavelength of approximately 1367 nm (1.367 microns), and optical means 14 for tripling the frequency of the beam of coherent infrared radiation to produce a beam of coherent blue light at a wavelength of approximately 455.6 nm (0.4556 microns), thus matching one of the absorption lines of cesium.

Figure 3:
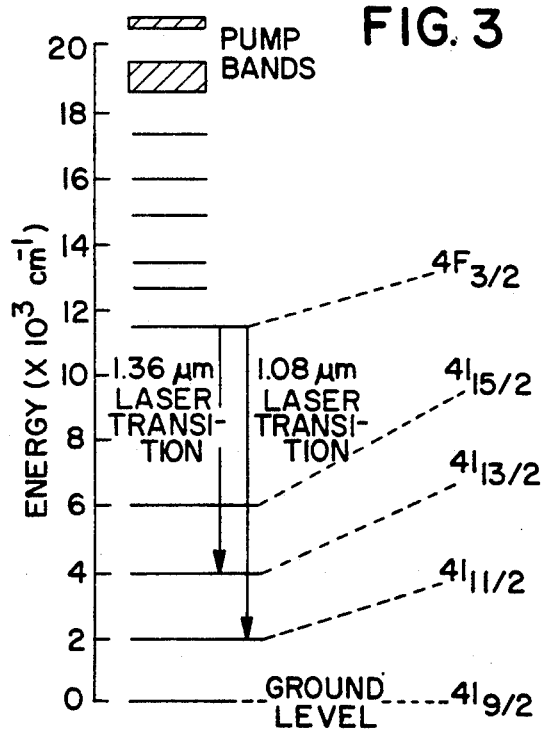
FIG. 3 is an illustration of two transitions of a trivalent neodymium ion in scandium oxide.
Figure 2:
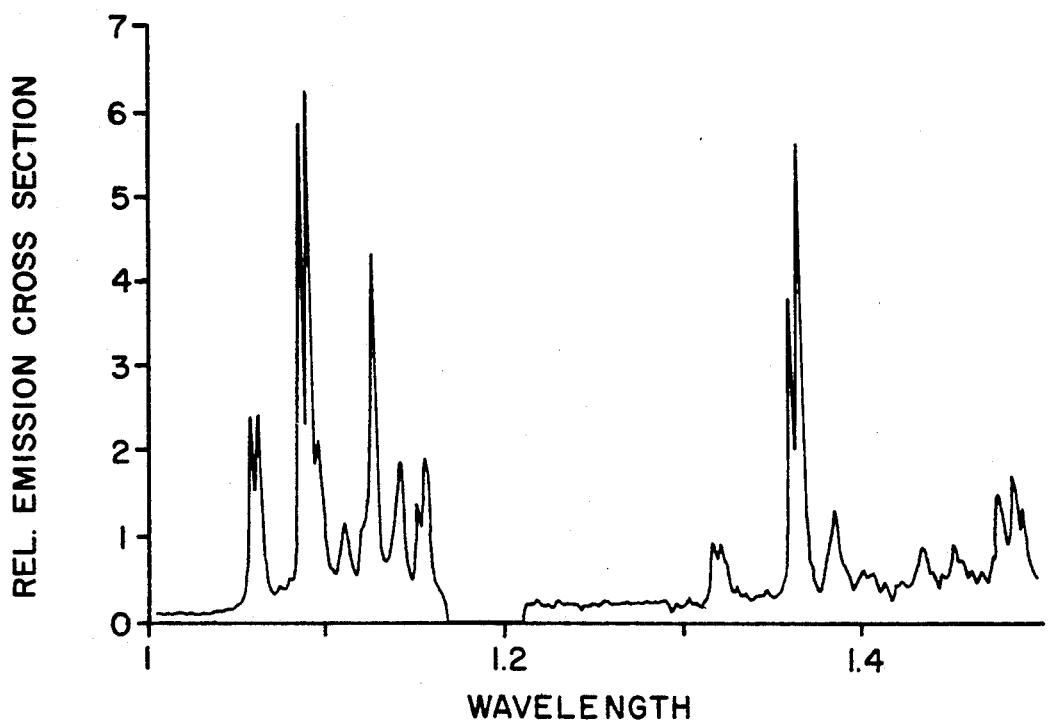
FIG. 2 is a graph of the emission spectrum of neodymium-doped scandium oxide between the wavelengths of 1.0 and 1.5 microns.
Figure 4:
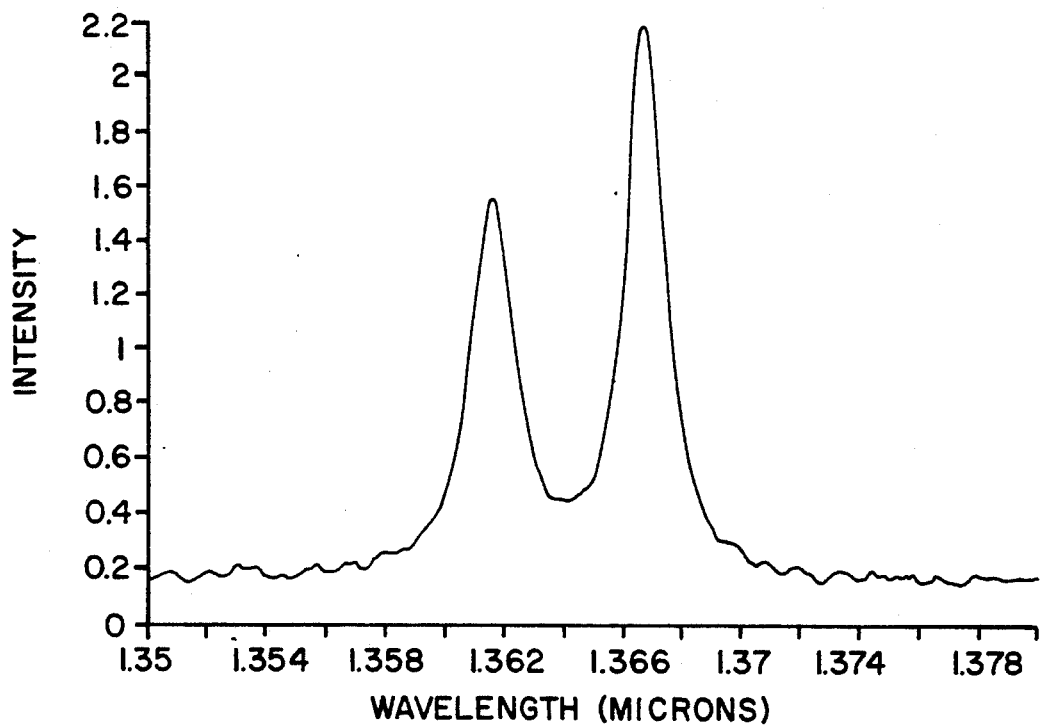
FIG. 4 is a high resolution graph of the emission spectrum of neodymium-doped scandium oxide near the wavelength of 1.367 microns.

FIG. 2 illustrates the emission spectrum of neodymium-doped scandium oxide between 1000 nm (1.0 micron) and 1500 nm (1.5 microns). The two peaks in the emission spectrum, at wavelengths of approximately 1085 nm (1.085 microns) and 1367 nm (1.367 microns), are the emission lines resulting from the transitions of neodymium ions ($Nd^{3+}$) from state $4F_{3/2}$ to the states $4I_{11/2}$ and $4I_{13/2}$, respectively. These two transitions are shown in FIG. 3. The two emission lines have approximately the same gain, and since a laser medium will attempt to lase at the emission line having the higher gain, this allows the emission at the undesirable shorter wavelength to be easily discriminated against. The emission line at the desirable longer wavelength is shown in greater detail in FIG. 4.

The laser medium 10 preferably includes a host crystal of scandium oxide which is doped with trivalent neodymium ions ($Nd^{3+}$) to a concentration of between approximately 0.25 and 4%. However, the scandium metal can be partially replaced by other metals, such as gadolinium (Gd). The laser medium 10 is combined with the semiconductor diode laser array 12 in an optical resonance cavity to form an oscillator. The resonance cavity is formed by a totally reflective mirror and a partially transmissive mirror. In order to better exploit the 1367 nm transition, resonator mirrors with dichroic coatings having a reflectance centered on the 1367 nm wavelength and highly transmissive at the 1085 nm wavelength may be used. For Q-switched operation, a Q-switch is positioned in the optical resonance cavity. A two-stage, double-pass amplifier of neodymium-doped scandium oxide laser material may be placed between the oscillator and the optical means 14 for amplification of the laser beam.

The semiconductor diode laser array 12 is preferably of gallium arsenide (GaAs) or gallium aluminum arsenide (GaAlAs) and should operate at a wavelength matching one of the absorption bands of neodymium-doped scandium oxide. The optical pumping beam is preferably fed transversely into the laser medium 10. An injection seeder 16 may be used to injection lock the emission line of the laser medium 10 at exactly the desired wavelength. The injection seeder 16 is preferably a temperature-tuned 1367 nm continuous wave diode laser.

Optical means 14 includes a frequency doubling crystal 18 and a frequency summing crystal 20 to triple the frequency of the emission line at 1367 nm. These nonlinear optical crystals 18, 20 double the frequency and then add the doubled and original frequencies to provide the tripled frequency. The frequency doubling crystal 18 is preferably beta barium borate ($\beta BaB_2O_4$) and the frequency summing crystal 20 is preferably potassium dihydrogen phosphate (KD*P).

From the foregoing, it will be appreciated that the present invention represents a significant advance in the field of solid-state lasers. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A solid-state blue laser, comprising:
   a solid-state laser medium of neodymium-doped scandium oxide ($Nd:Sc_2O_3$);
   a semiconductor diode laser array for optically pumping the laser medium to produce a beam of coherent infrared radiation at a wavelength of approximately 1367 nanometers; and
   optical means for tripling the frequency of the beam of coherent infrared radiation to produce a beam of coherent blue light at a wavelength of approximately 455.6 nanometers.

2. The solid-state blue laser as set forth in claim 1, wherein the optical means includes a doubling crystal and a summing crystal.

3. The solid-state blue laser as set forth in claim 1, and further including an injection seeder to injection lock the laser medium at the wavelength of 1367 nanometers.

4. The solid-state blue laser as set forth in claim 1, wherein the scandium metal is partially replaced by gadolinium.

5. A solid-state blue laser, comprising:
   a solid-state laser medium of neodymium-doped scandium oxide ($Nd:Sc_2O_3$), the laser medium being pumped to produce a beam of coherent infrared radiation at a wavelength of approximately 1367 nanometers; and
   optical means for tripling the frequency of the beam of coherent infrared radiation to form a beam of coherent blue light at a wavelength of approximately 455.6 nanometers.

6. The solid-state blue laser as set forth in claim 5, wherein the optical means includes a doubling crystal and a summing crystal.

7. The solid-state blue laser as set forth in claim 5, and further including an injection seeder to injection lock the laser medium at the wavelength of 1367 nanometers.

8. The solid-state blue laser as set forth in claim 5, wherein the scandium metal is partially replaced by gadolinium.

9. A solid-state laser medium, comprising:
   a scandium oxide ($Sc_2O_3$) host material doped with trivalent neodymium ions ($Nd^{3+}$), wherein the host material is doped with neodymium ions to a concentration of between approximately 0.25% and 4%.

10. The solid-state blue laser as set forth in claim 9, wherein the scandium metal is partially replaced by gadolinium.

11. A method for generating coherent blue light, comprising the steps of:
    pumping a solid-state laser medium of neodymium-doped scandium oxide ($Nd:Sc_2O_3$) with optical radiation to excite a beam of coherent infrared radiation at a wavelength of approximately 1367 nanometers; and
    tripling the frequency of the beam of coherent infrared radiation to form a beam of coherent blue light at a wavelength of approximately 455.6 nanometers.

12. The method as set forth in claim 11, wherein the scandium metal is partially replaced by gadolinium.

* * * * *